United States Patent
Krantz et al.

(10) Patent No.: US 9,942,515 B2
(45) Date of Patent: Apr. 10, 2018

(54) SMART DEVICE PAIRING AND CONFIGURATION FOR MEETING SPACES

(71) Applicant: Microsoft Technology Licensing, LLC, Redmond, WA (US)

(72) Inventors: Anton Krantz, Kirkland, WA (US); William George Verthein, Sammamish, WA (US); Srikanth Shoroff, Bellevue, WA (US); Amey Parandekar, Kirkland, WA (US); Mohammad N. Vakil, Redmond, WA (US); Steven Shaw, Bellevue, WA (US); Nghiep Duong, Sammamish, WA (US); Ankit Tandon, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 18 days.

(21) Appl. No.: 13/804,587

(22) Filed: Mar. 14, 2013

(65) Prior Publication Data

US 2014/0267559 A1    Sep. 18, 2014

(51) Int. Cl.
*H04N 7/14* (2006.01)
*H04N 7/15* (2006.01)
*H04M 9/08* (2006.01)

(52) U.S. Cl.
CPC ............. *H04N 7/15* (2013.01); *H04M 9/082* (2013.01)

(58) Field of Classification Search
CPC ........ H04B 5/00; H04B 5/0031; H04B 5/005; H04B 5/02; H04B 5/04; H04M 3/56; H04M 3/568; H04M 3/567; H04N 7/14; H04N 7/15; H04N 7/142; H04N 7/147; H04W 4/008; H04W 4/06; H04W 4/16

USPC ......... 348/14.01, 14.02, 14.04, 14.05, 14.07, 348/14.08, 14.09, 14.12, 14.16
See application file for complete search history.

(56) References Cited

U.S. PATENT DOCUMENTS

| | | | | |
|---|---|---|---|---|
| 5,844,599 | A * | 12/1998 | Hildin | H04N 7/142 348/14.1 |
| 6,119,147 | A * | 9/2000 | Toomey et al. | 709/204 |
| 7,362,349 | B2 | 4/2008 | Nelson et al. | |
| 7,707,256 | B2 * | 4/2010 | Rollin | G06Q 10/02 235/377 |
| 8,289,900 | B2 | 10/2012 | DuMas et al. | |
| 8,368,738 | B2 * | 2/2013 | Schindler | H04N 7/15 348/14.01 |

(Continued)

FOREIGN PATENT DOCUMENTS

| CN | 102307269 A | 1/2012 |
|---|---|---|
| CN | 102318277 A | 1/2012 |

OTHER PUBLICATIONS

Smart Technologies, "Bridgit Conferencing Software", 2013, 5 pages, Available at:http://smarttech.com/bridgit.

(Continued)

*Primary Examiner* — Binh Kien Tieu (57) ABSTRACT

Pairing and configuring a computing device for use in a meeting space is provided. An appliance may communicate a broadcast to a computing device which announces the availability of a meeting space for a meeting. The computing device may establish a connection with the appliance. The computing device may then join the meeting in the meeting space.

20 Claims, 6 Drawing Sheets

(56) References Cited

U.S. PATENT DOCUMENTS

| | | |
|---|---|---|
| 2002/0191071 A1* | 12/2002 | Rui .................. H04N 7/142 348/14.03 |
| 2004/0010464 A1* | 1/2004 | Boaz ............................ 705/40 |
| 2005/0190768 A1 | 9/2005 | Cutler |
| 2005/0193060 A1* | 9/2005 | Barton ......................... 709/204 |
| 2006/0250278 A1 | 11/2006 | Tillotson et al. |
| 2009/0174763 A1 | 7/2009 | Bengtsson et al. |
| 2009/0179983 A1* | 7/2009 | Schindler ................ H04N 7/15 348/14.08 |
| 2009/0265280 A1 | 10/2009 | Taneja et al. |
| 2010/0149307 A1 | 6/2010 | Iyer et al. |
| 2010/0188473 A1 | 7/2010 | King et al. |
| 2010/0228825 A1 | 9/2010 | Hedge et al. |
| 2010/0246448 A1 | 9/2010 | Krantz et al. |
| 2010/0279611 A1* | 11/2010 | Kumazawa ............... H04L 9/32 455/41.2 |
| 2010/0283613 A1* | 11/2010 | Palin .................. H04L 12/2809 340/572.1 |
| 2011/0167078 A1* | 7/2011 | Benjamin ............ G06Q 10/109 707/769 |
| 2012/0011450 A1* | 1/2012 | To ................................. 715/752 |
| 2012/0062360 A1 | 3/2012 | Wendt |
| 2012/0150577 A1* | 6/2012 | Berg ................. G06Q 10/0631 705/7.12 |
| 2012/0150956 A1* | 6/2012 | Tucker ................ H04L 65/1069 709/204 |
| 2012/0185291 A1* | 7/2012 | Ramaswamy ..... G06Q 10/1095 705/7.19 |
| 2012/0306995 A1 | 12/2012 | Huitema et al. |
| 2012/0327173 A1 | 12/2012 | Couse et al. |
| 2013/0004069 A1* | 1/2013 | Hawkins ............ G06K 9/00402 382/165 |
| 2013/0064142 A1* | 3/2013 | Bhow ................ H04L 12/1818 370/260 |
| 2013/0106982 A1* | 5/2013 | Anantharaman et al. . 348/14.03 |
| 2013/0191891 A1* | 7/2013 | Adderly ................ H04W 12/06 726/5 |
| 2013/0210351 A1* | 8/2013 | Ling ..................... H04W 4/008 455/41.1 |
| 2013/0210353 A1* | 8/2013 | Ling et al. ................... 455/41.1 |
| 2013/0271561 A1* | 10/2013 | Thapa .................... H04N 7/141 348/14.08 |
| 2014/0058778 A1* | 2/2014 | McLarty ............ G06Q 10/1095 705/7.19 |
| 2014/0079200 A1* | 3/2014 | Kusakari ............... H04M 3/563 379/142.1 |
| 2014/0108544 A1* | 4/2014 | Lewis .................... H04W 4/026 709/204 |
| 2014/0109210 A1* | 4/2014 | Borzycki ................ G06F 3/017 726/7 |
| 2014/0149519 A1* | 5/2014 | Redfern ................ H04L 65/403 709/206 |
| 2014/0242959 A1* | 8/2014 | Virolainen et al. ........... 455/416 |
| 2014/0254820 A1* | 9/2014 | Gardenfors ............ H04R 3/005 381/80 |
| 2015/0264314 A1* | 9/2015 | Goesnar .............. H04L 12/1818 348/14.08 |

OTHER PUBLICATIONS

Cutler, et al.,"Distributed Meetings: A Meeting Capture and Broadcasting System" In Proceedings of the Tenth ACM International Conference on Multimedia, Dec. 1, 2002, 10 pages.

Rui, et al.,"PING: A Group-to-Individual Distributed Meeting System", In Proceedings of In IEEE International Conference on Multimedia and Expo, Jul. 9, 2006, 4 pages.

Cisco Systems, "Interactive Kiosk", Published on: Jan. 23, 2010, 3 pages, Available at: http://www.cisco.com/web/HK/solutions/isv/interactive_kiosk.html.

International Search Report dated Sep. 22, 2014 in Appln No. PCT/US2014/020301; 11 pgs.

European Search Report in Application 14713657.6, dated Oct. 20, 2016, 13 pages.

PCT International Preliminary Report on Patentability in Application US/2014/020301, dated Sep. 24, 2015, 8 pages.

"First Office Action Issued in Chinese Patent Application 201480014347.X", dated Sep. 27, 2017, 12 Pages.

* cited by examiner

MOBILE COMPUTING DEVICE

SMART DEVICE PAIRING AND CONFIGURATION FOR MEETING SPACES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Meetings are a daily part of the work environment. Due to recent advances in real-time communications technology as well as trends toward distributed workforces, many meetings in today's work environment consist of in-room as well as remote attendees. As a result, meeting rooms utilize audio/video technology for enabling communication with remote attendees and for presenting meeting content to in-room attendees on shared displays. Current meeting room setups provide videoconferencing ("VTC") units or other peripherals (e.g., computing devices) incorporating video conferencing software, to which users may connect to in order to start a meeting. Drawbacks associated with current meeting setups include the fact that they are often costly and further may be dependent on unknown and/or unreliable computing device hardware states, thereby causing delays in the start of scheduled meetings. It is with respect to these considerations and others that the various embodiments of the present invention have been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are provided for pairing and configuring a computing device for use in a meeting space. An appliance may communicate a broadcast to a computing device which announces the availability of a meeting space for a meeting. The computing device may establish a connection with the appliance. The computing device may then join the meeting in the meeting space.

These and other features and advantages will be apparent from a reading of the following detailed description and a review of the associated drawings. It is to be understood that both the foregoing general description and the following detailed description are illustrative only and are not restrictive of the invention as claimed.

DETAILED DESCRIPTION

Embodiments are provided for pairing and configuring a computing device for use in a meeting space. An appliance may communicate a broadcast to a computing device which announces the availability of a meeting space for a meeting. The computing device may establish a connection with the appliance. The computing device may then join the meeting in the meeting space.

In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents.

Figure 1:
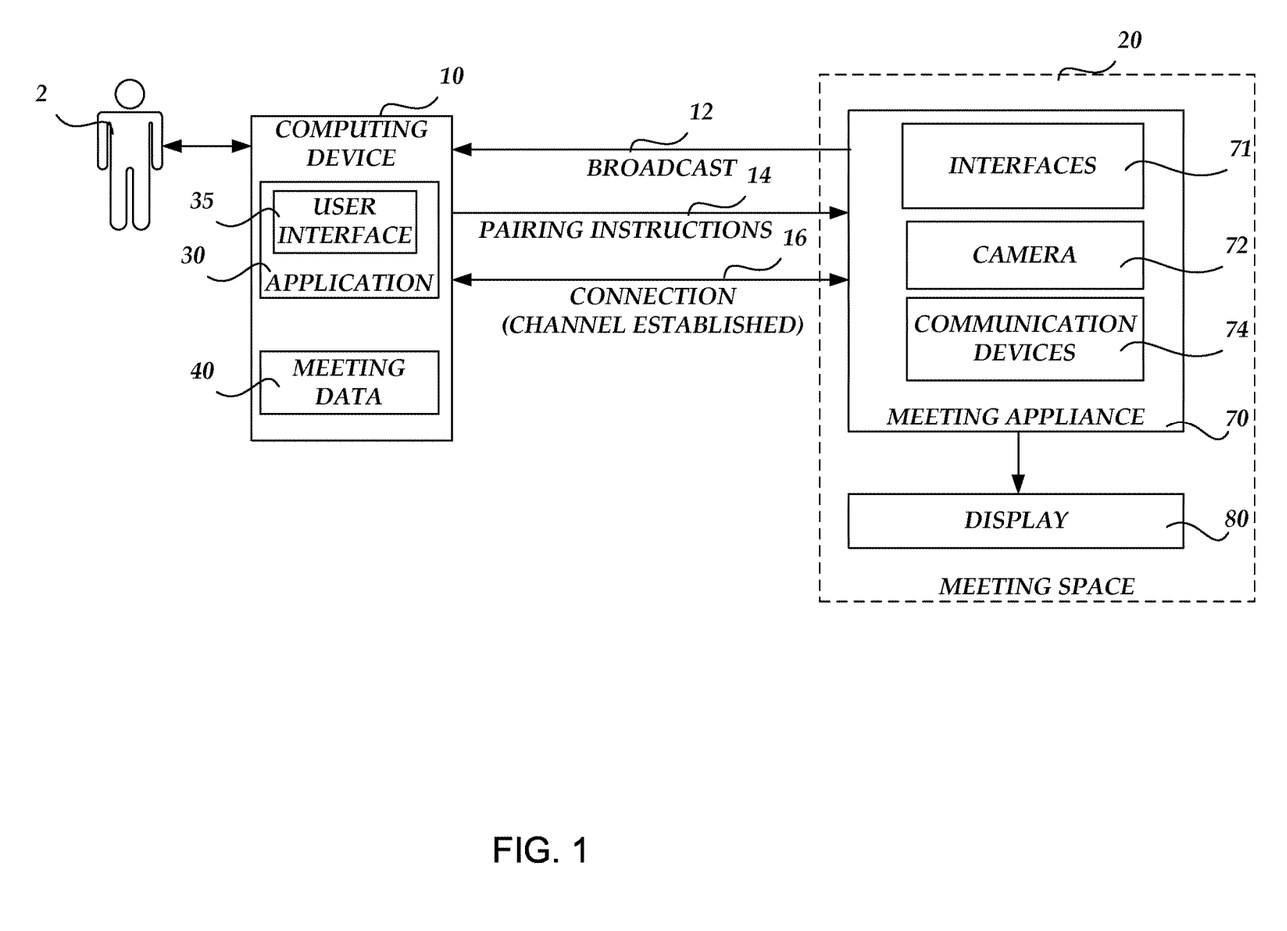
FIG. 1 is a block diagram illustrating a network architecture for pairing and configuring a computing device for use in a meeting space, in accordance with various embodiments.

Referring now to the drawings, in which like numerals represent like elements through the several figures, various aspects of the present invention will be described. FIG. 1 is a block diagram illustrating a network architecture for pairing and configuring a computing device for use in a meeting space, in accordance with various embodiments. The network architecture includes a computing device 10 in communication with a meeting appliance 70 which may be located in a meeting space 20. In accordance with an embodiment, the computing device 10 may comprise a mobile computing device (e.g., a tablet, laptop computing device or smartphone) which is utilized by a user 2 for performing various functions. In particular, the computing device 10 may comprise an application 30 which is configured to establish communication with the meeting appliance 70 so that the user 2 may join and participate in a meeting held in the meeting space 20. In particular, the application 30 may be configured to cause the computing device 10 to receive a broadcast 12 from the meeting appliance 70 which indicates the availability of the meeting appliance 70. The application 30 may further be configured to cause the computing device 10 to send paring instructions 14 to the meeting appliance 70 which enables the establishment of a connection 16 between the computing device 10 and the meeting appliance 70. The application 30 may also be configured to provide a user interface 35 for conducting one or more functions associated with a meeting (e.g., adding one or more participants, muting participants, selecting content to share, choosing meeting views to show on a meeting room display, etc.). In accordance with an embodiment, the application 30 may comprise a unified communications platform which may include, but is not limited to, functionality for instant messaging, presence, file transfer, peer-to-peer and multiparty voice and video calling, ad hoc and structured conferences (audio, video and web) and public switched telephone network ("PSTN") connectivity. An illustrative unified communications platform which may be utilized with the various embodiments described herein is the LYNC enterprise-ready unified communications platform software from MICROSOFT CORPORATION of Redmond, Wash. It should be understood, however, that other communications platform software from other manufacturers may alternatively be utilized in accordance with the various embodiments described herein. The computing device 10 may also store meeting data 40. In accordance with an embodiment, the meeting data 40 may include, without limitation, a roster (or list) of meeting participants, scheduled meeting information (e.g., a calendar) and meeting content (e.g., photos of concepts, designs, documents, slides, etc.). An illustrative routine which describes operations performed by the application 30 will be discussed in greater detail below with respect to FIG. 2.

In accordance with an embodiment, the meeting appliance 70 may be connected to a display 80 and may comprise an embedded device including interfaces 71, a camera 72, one or more communication devices 74 and a smart card 76. The interfaces 71 may include a wireless interface which enables the computing device 10 to discover and connect to the meeting appliance 70. The interfaces 71 may further include a network interface for connecting to an online communication session, such as a meeting. It should be understood that the network interface may be either wired or wireless. The camera 72 may comprise a webcam (which may include a microphone for capturing audio). In accordance with the present embodiment, the communication devices 74 may comprise devices for establishing wireless communications with computing devices in proximity to the meeting appliance 70 for authenticating a user during a pairing process. The communication devices 74 may include, without limitation, Near Field Communication ("NFC") devices, BLUETOOTH wireless technology devices, Smart Card devices and WI-FI devices. It should be appreciated that the camera 72 may also be utilized for authentication via facial recognition.

Figure 2:
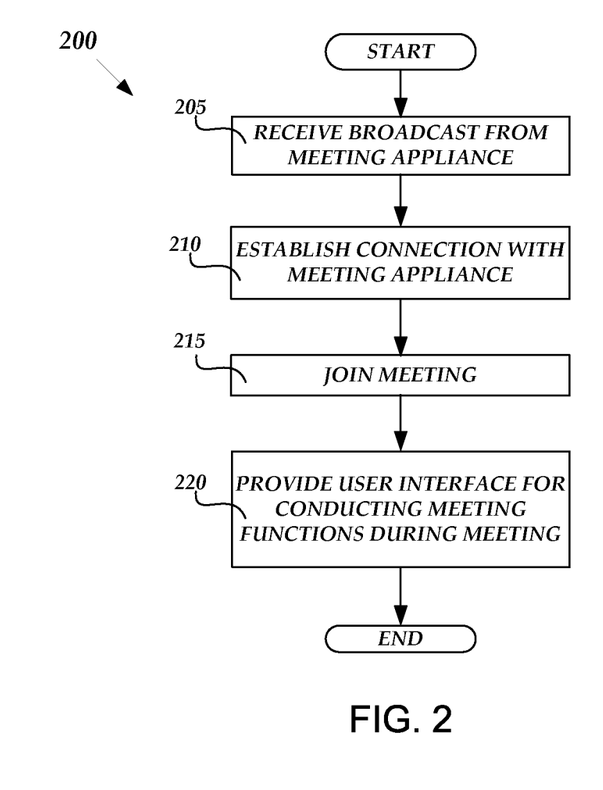
FIG. 2 is a flow diagram illustrating a routine for pairing and configuring a computing device for use in a meeting space, in accordance with an embodiment.

FIG. 2 is a flow diagram illustrating a routine 200 for pairing and configuring a computing device for use in a meeting space, in accordance with an embodiment. When reading the discussion of the routines presented herein, it should be appreciated that the logical operations of various embodiments of the present invention are implemented (1) as a sequence of computer implemented acts or program modules running on a computing system and/or (2) as interconnected machine logical circuits or circuit modules within the computing system. The implementation is a matter of choice dependent on the performance requirements of the computing system implementing the invention. Accordingly, the logical operations illustrated in FIG. 2 and making up the various embodiments described herein are referred to variously as operations, structural devices, acts or modules. It will be recognized by one skilled in the art that these operations, structural devices, acts and modules may be implemented in software, in hardware, in firmware, in special purpose digital logic, and any combination thereof without deviating from the spirit and scope of the present invention as recited within the claims set forth herein.

The routine 200 begins at operation 205, where the application 30, executing on the computing device 10, may receive the broadcast 12 from the meeting appliance 70. In particular, the meeting appliance 70 may send out a wireless broadcast signal that it is available for connection to the computing device 10. In accordance with an embodiment, the broadcast 12 may be restricted to a physical meeting space (e.g., the meeting space 10) using wireless power management and directionality.

From operation 205, the routine 200 continues to operation 210, where the application, executing on the computing device 10, may establish the connection 16 with the meeting appliance 70. In particular, the computing device 10 may detect the broadcast 12 from the meeting appliance 70 and choose to connect to it using the pairing instructions 14. It should be understood that the connection to the meeting appliance 70 may be accomplished automatically (such as by checking the meeting data 40 to determine that the user 2 has a meeting scheduled around the time the broadcast is detected) or via a user prompt according to a predetermined policy or preference. In accordance with an embodiment, the paring instructions may comprise an exchange of Third Party Control Protocol ("TPCP") and Session Initiated Protocol ("SIP") data (i.e., TPCP/SIP data) between the computing device 10 and the meeting appliance 70. As should be understood by those skilled in the art, TPCP is a client-server protocol which is used to initiate, control and observe sessions between remote parties and which includes three types of primitives: Request, Notify and Responses. As should also be understood by those skilled in the art, SIP is a signaling protocol used for controlling communication sessions over Internet Protocol ("IP"). The protocol can be used for creating, modifying and terminating two-party (unicast) or multiparty (multicast) communication sessions. In accordance with one example, a TPCP paring data (including the user's SIP address) may be sent from the user 2's computing device 10 to the meeting appliance 70 when the user 2 is in proximity to the meeting appliance 70. For example, the application 30 may configure the computing device 10 so that it can detect that it is in proximity to the meeting appliance 70 which is in a meeting. The meeting appliance 70 may then return a TPCP signal requesting an authentication code from the computing device 10. The authorization code may be obtained by prompting the user to communicate the code (e.g., a numerical code) or automatically from the computing device 10 via any of a number of authentication methods including, without limitation, facial recognition, NFC authentication and Smart Card authentication. Upon the completion of the authentication process, the paring process is completed and a control channel may be established between the computing device 10 and the meeting appliance 70.

From operation 210, the routine 200 continues to operation 215, where the application 30, executing on the computing device 10, may join a meeting in the meeting space 20 via the meeting appliance 70. In accordance with an embodiment, the particular, the computing device 10 may join a meeting when it is remotely located with respect to the meeting appliance 70 in the meeting space 20. In accordance with another embodiment, the computing device 10 may join a meeting when it is in proximity to the meeting appliance 70 (i.e., the user 2 of the computing device 10 is physically in the meeting space 20 for the meeting). It should be understood that when the computing device 10 joins a meeting, the meeting appliance 70's webcam and microphone may be utilized to capture audio and video and the meeting room display (e.g., the display 70) may be utilized to show a meeting view (e.g., video of remote participants and any content uploaded to the meeting). Remote participants may also see the user 2 in a roster (i.e., a meeting roster). In accordance with an embodiment, once a meeting has been joined, the meeting roster of participants may be automatically updated on the computing device 10. The meeting roster may include the names of meeting attendees in the meeting space 20. Furthermore, remote attendees may know who is in the meeting room and who is talking via the aforementioned meeting roster. In accordance with an embodiment, presence information associated with meeting attendees may be automatically updated (e.g., a presence may be updated to "in a conference" as opposed to "in a meeting") so that they are not disturbed during the meeting. In accordance with an embodiment, the audio portion of a meeting may not be joined in order to avoid feedback/echo.

From operation 215, the routine 200 continues to operation 220, where the meeting application 30, executing on the computing device 10, may provide the user interface 35 for conducting meeting functions during the meeting. In particular, the user interface 35 may be utilized to add participants, mute participants, select content to share, choose meeting views to show on a meeting room display and communicate content, commands and responses during the meeting. For example, meeting participants may use the user interface 35 on the computing device 10 to add content into a meeting (e.g., add photos of concepts, designs, whiteboard, share documents, slides, etc.), drive the meeting (e.g., navigate slides, invite new attendees, etc.) and communicate via a back-channel in the meeting (e.g., respond to a poll, send/receive instant messages, respond to questions and answers, troubleshoot issues on the side without disturbing the flow of the meeting, etc.). It should understood that in accordance with an embodiment, the user interface 35 may be configured to display video of additional attendees who are not being displayed on the meeting room display and asynchronously browse meeting content. It should be further understood that in accordance with an embodiments, the meeting room may also be configured (e.g., by using the user interface 35) from the computing device 10 according to user preferences. For example, the user interface 35, provided by the application 30, may allow the user 2 to manage the environment of the meeting space (e.g., displays, video, audio, lighting, etc.) from the computing device 10. From operation 220, the routine 200 then ends.

Figure 3:
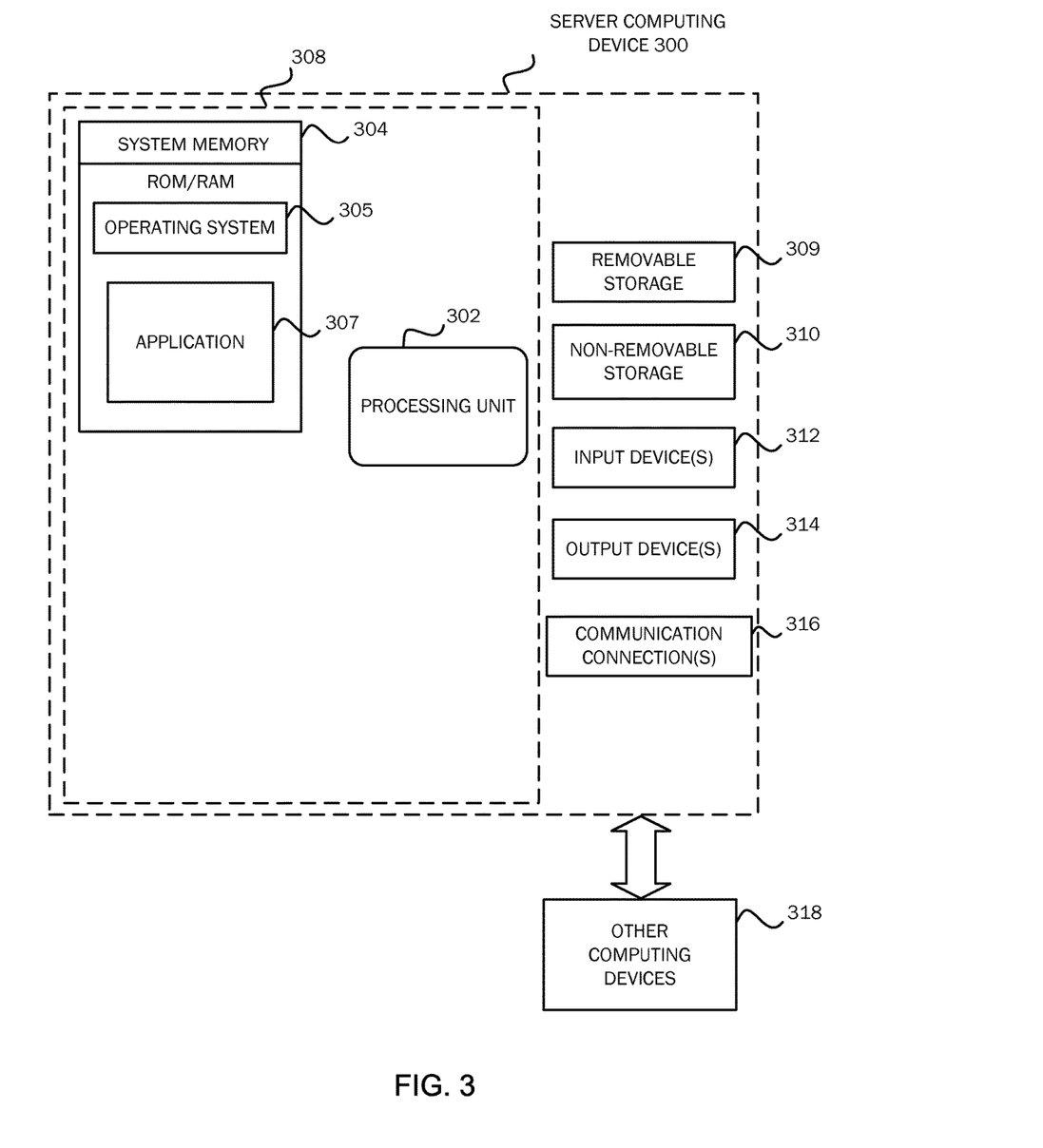
FIG. 3 is a simplified block diagram of a computing device with which various embodiments may be practiced.

FIG. 3 is a block diagram illustrating example physical components of a computing device 300 with which various embodiments may be practiced. In a basic configuration, the computing device 300 may include at least one processing unit 302 and a system memory 304. Depending on the configuration and type of computing device, system memory 304 may comprise, but is not limited to, volatile (e.g. random access memory (RAM)), non-volatile (e.g. read-only memory (ROM)), flash memory, or any combination. System memory 304 may include an operating system 305 and application 307. Operating system 305, for example, may be suitable for controlling the computing device 300's operation and, in accordance with an embodiment, may comprise the WINDOWS operating systems from MICROSOFT CORPORATION of Redmond, Wash. The application 307, for example, may comprise functionality for pairing and configuring the computing device 300 for use in a meeting space. It should be understood, however, that the embodiments described herein may also be practiced in conjunction with other operating systems and application programs and further, is not limited to any particular application or system.

The computing device 300 may have additional features or functionality. For example, the computing device 300 may also include additional data storage devices (removable and/or non-removable) such as, for example, magnetic disks, optical disks, solid state storage devices ("SSD"), flash memory or tape. Such additional storage is illustrated in FIG. 3 by a removable storage 309 and a non-removable storage 310. The computing device 300 may also have input device(s) 312, output device(s) 314 and communication device(s) 316. The input device(s) 312) may include a keyboard, a mouse, a pen, a sound input device (e.g., a microphone), a touch input device for receiving gestures, etc. The output device(s) 314 such as a display, speakers, a printer, etc. may also be included. The aforementioned devices are examples and others may be used. The computing device 300 may also be in communication with other computing devices 318.

Generally, consistent with various embodiments, program modules may be provided which include routines, programs, components, data structures, and other types of structures that may perform particular tasks or that may implement particular abstract data types. Moreover, various embodiments may be practiced with other computer system configurations, including hand-held devices, multiprocessor systems, microprocessor-based or programmable consumer electronics, minicomputers, mainframe computers, automotive computing systems and the like. Various embodiments may also be practiced in distributed computing environments where tasks are performed by remote processing devices that are linked through a communications network. In a distributed computing environment, program modules may be located in both local and remote memory storage devices.

Furthermore, various embodiments may be practiced in an electrical circuit comprising discrete electronic elements, packaged or integrated electronic chips containing logic gates, a circuit utilizing a microprocessor, or on a single chip containing electronic elements or microprocessors. For example, various embodiments may be practiced via a system-on-a-chip ("SOC") where each or many of the components illustrated in FIG. 3 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein may operate via application-specific logic integrated with other components of the computing device/system 300 on the single integrated circuit (chip). Embodiments may also be practiced using other technologies capable of performing logical operations such as, for example, AND, OR, and NOT, including but not limited to mechanical, optical, fluidic, and quantum technologies. In addition, embodiments may be practiced within a general purpose computer or in any other circuits or systems.

Various embodiments, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media. Computer storage media may include volatile and nonvolatile, removable and non-removable media implemented in any method or technology for storage of information (such as computer readable instructions, data structures, program modules, or other data) in hardware. The system memory 304, removable storage 309, and non-removable storage 310 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by the computing device 300. Any such computer storage media may be part of the computing device 300.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 4A:
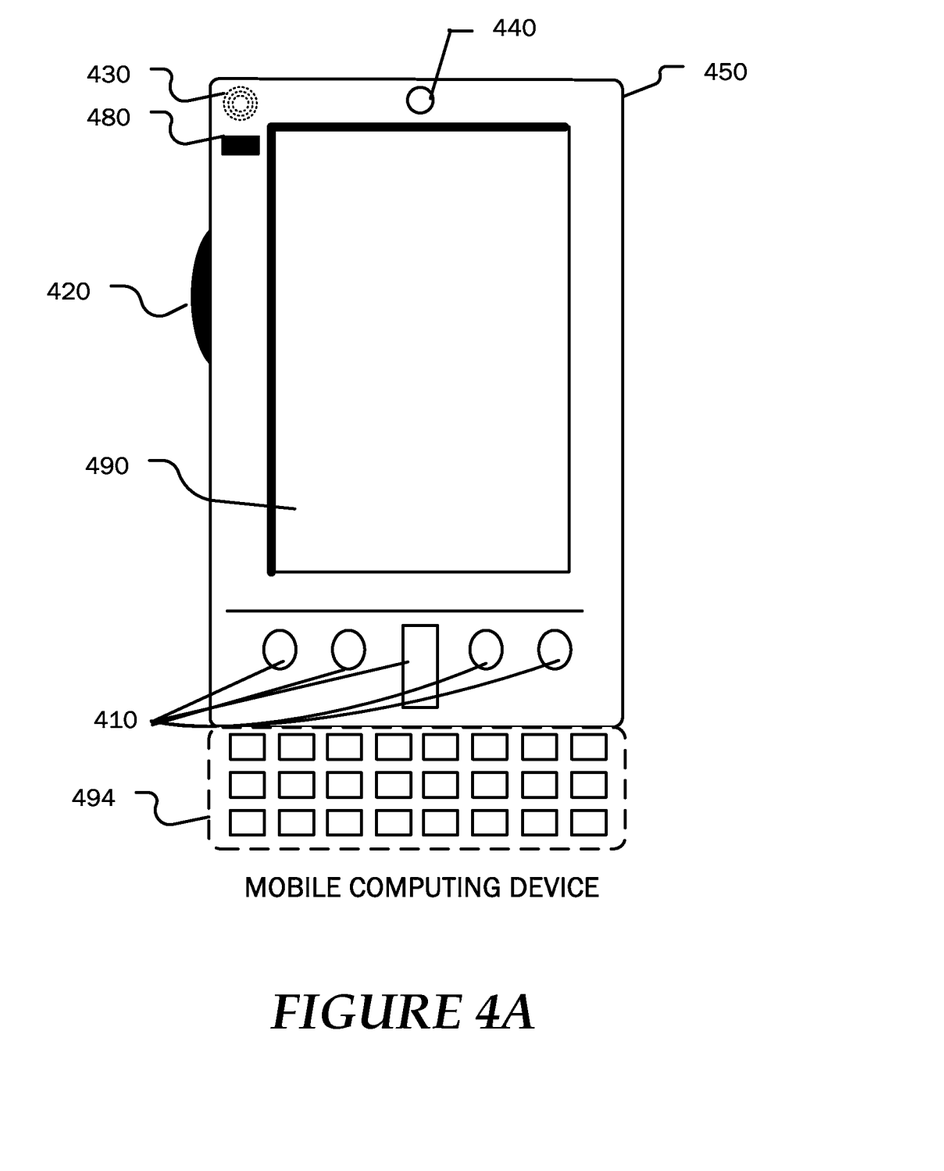
FIG. 4A is a simplified block diagram of a mobile computing device with which various embodiments may be practiced.
Figure 4B:
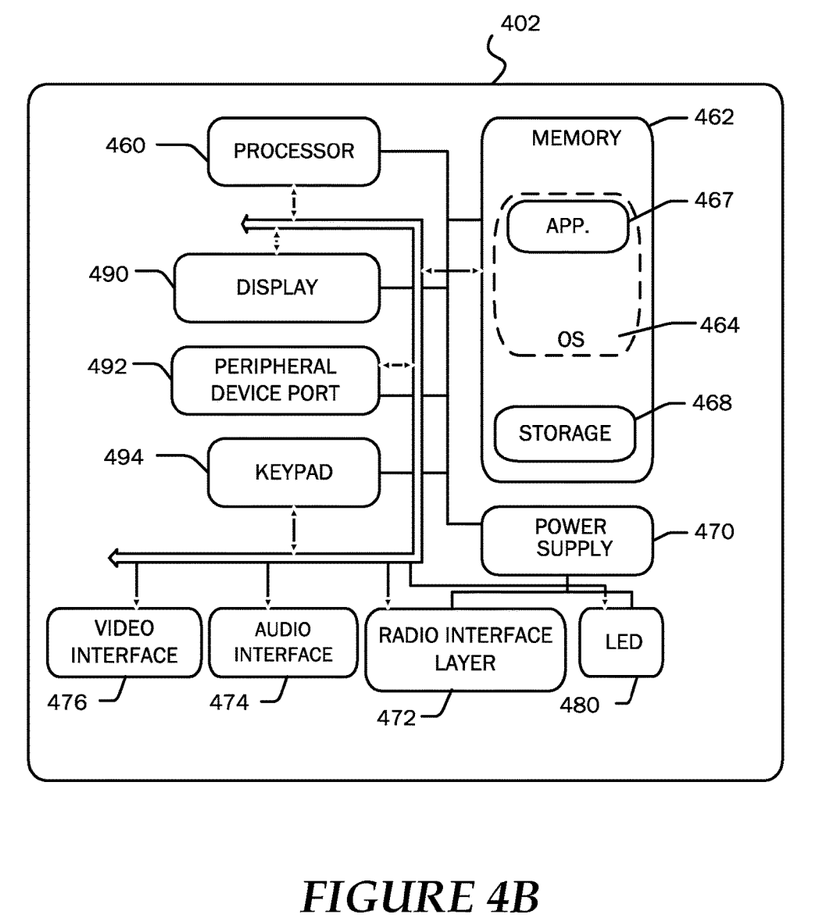
FIG. 4B is a simplified block diagram of a mobile computing device with which various embodiments may be practiced.

FIGS. 4A and 4B illustrate a suitable mobile computing environment, for example, a mobile computing device 450 which may include, without limitation, a smartphone, a tablet personal computer, a laptop computer, and the like, with which various embodiments may be practiced. With reference to FIG. 4A, an example mobile computing device 450 for implementing the embodiments is illustrated. In a basic configuration, mobile computing device 450 is a handheld computer having both input elements and output elements. Input elements may include touch screen display 425 and input buttons 410 that allow the user to enter information into mobile computing device 450. Mobile computing device 450 may also incorporate an optional side input element 420 allowing further user input. Optional side input element 420 may be a rotary switch, a button, or any other type of manual input element. In alternative embodiments, mobile computing device 450 may incorporate more or less input elements. For example, display 425 may not be a touch screen in some embodiments. In yet another alternative embodiment, the mobile computing device is a portable telephone system, such as a cellular phone having display 425 and input buttons 410. Mobile computing device 450 may also include an optional keypad 405. Optional keypad 405 may be a physical keypad or a "soft" keypad generated on the touch screen display.

Mobile computing device 450 incorporates output elements, such as display 425, which can display a graphical user interface (GUI). Other output elements include speaker 430 and LED 480. Additionally, mobile computing device 450 may incorporate a vibration module (not shown), which causes mobile computing device 450 to vibrate to notify the user of an event. In yet another embodiment, mobile computing device 450 may incorporate a headphone jack (not shown) for providing another means of providing output signals.

Although described herein in combination with mobile computing device 450, in alternative embodiments may be used in combination with any number of computer systems, such as in desktop environments, laptop or notebook computer systems, multiprocessor systems, micro-processor based or programmable consumer electronics, network PCs, mini computers, main frame computers and the like. Various embodiments may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate the various embodiments described herein.

FIG. 4B is a block diagram illustrating components of a mobile computing device used in one embodiment, such as the mobile computing device 450 shown in FIG. 4A. That is, mobile computing device 450 can incorporate a system 402 to implement some embodiments. For example, system 402 can be used in implementing a "smart phone" that can run one or more applications similar to those of a desktop or notebook computer. In some embodiments, the system 402 is integrated as a computing device, such as an integrated personal digital assistant (PDA) and wireless phone.

Applications 467 may be loaded into memory 462 and run on or in association with an operating system 464. The system 402 also includes non-volatile storage 468 within memory the 462. Non-volatile storage 468 may be used to store persistent information that should not be lost if system 402 is powered down. The applications 467 may use and store information in the non-volatile storage 468. The applications 467 may also include functionality for pairing and configuring the computing device 450 for use in a meeting space. A synchronization application (not shown) also resides on system 402 and is programmed to interact with a corresponding synchronization application resident on a host computer to keep the information stored in the non-volatile storage 468 synchronized with corresponding information stored at the host computer. As should be appreciated, other applications may also be loaded into the memory 462 and run on the mobile computing device 450.

The system 402 has a power supply 470, which may be implemented as one or more batteries. The power supply 470 might further include an external power source, such as an AC adapter or a powered docking cradle that supplements or recharges the batteries.

The system 402 may also include a radio 472 (i.e., radio interface layer) that performs the function of transmitting and receiving radio frequency communications. The radio 472 facilitates wireless connectivity between the system 402 and the "outside world," via a communications carrier or service provider. Transmissions to and from the radio 472 are conducted under control of OS 464. In other words, communications received by the radio 472 may be disseminated to the applications 467 via OS 464, and vice versa.

The radio 472 allows the system 402 to communicate with other computing devices, such as over a network. The radio 472 is one example of communication media. The embodiment of the system 402 is shown with two types of notification output devices: the LED 480 that can be used to provide visual notifications and an audio interface 474 that can be used with speaker 430 to provide audio notifications. These devices may be directly coupled to the power supply 470 so that when activated, they remain on for a duration dictated by the notification mechanism even though processor 460 and other components might shut down for conserving battery power. The LED 480 may be programmed to remain on indefinitely until the user takes action to indicate the powered-on status of the device. The audio interface 474 is used to provide audible signals to and receive audible signals from the user. For example, in addition to being coupled to speaker 430, the audio interface 474 may also be coupled to a microphone (not shown) to receive audible (e.g., voice) input, such as to facilitate a telephone conversation. In accordance with embodiments, the microphone may also serve as an audio sensor to facilitate control of notifications. The system 402 may further include a video interface 476 that enables an operation of on-board camera 440 to record still images, video streams, and the like.

A mobile computing device implementing the system 402 may have additional features or functionality. For example, the device may also include additional data storage devices (removable and/or non-removable) such as, magnetic disks, optical disks, or tape. Such additional storage is illustrated in FIG. 4B by storage 468.

Data/information generated or captured by the mobile computing device 450 and stored via the system 402 may be stored locally on the mobile computing device 450, as described above, or the data may be stored on any number of storage media that may be accessed by the device via the radio 472 or via a wired connection between the mobile computing device 450 and a separate computing device associated with the mobile computing device 450, for example, a server computer in a distributed computing network such as the Internet. As should be appreciated such data/information may be accessed via the mobile computing device 450 via the radio 472 or via a distributed computing network. Similarly, such data/information may be readily transferred between computing devices for storage and use according to well-known data/information transfer and storage means, including electronic mail and collaborative data/information sharing systems.

Figure 5:
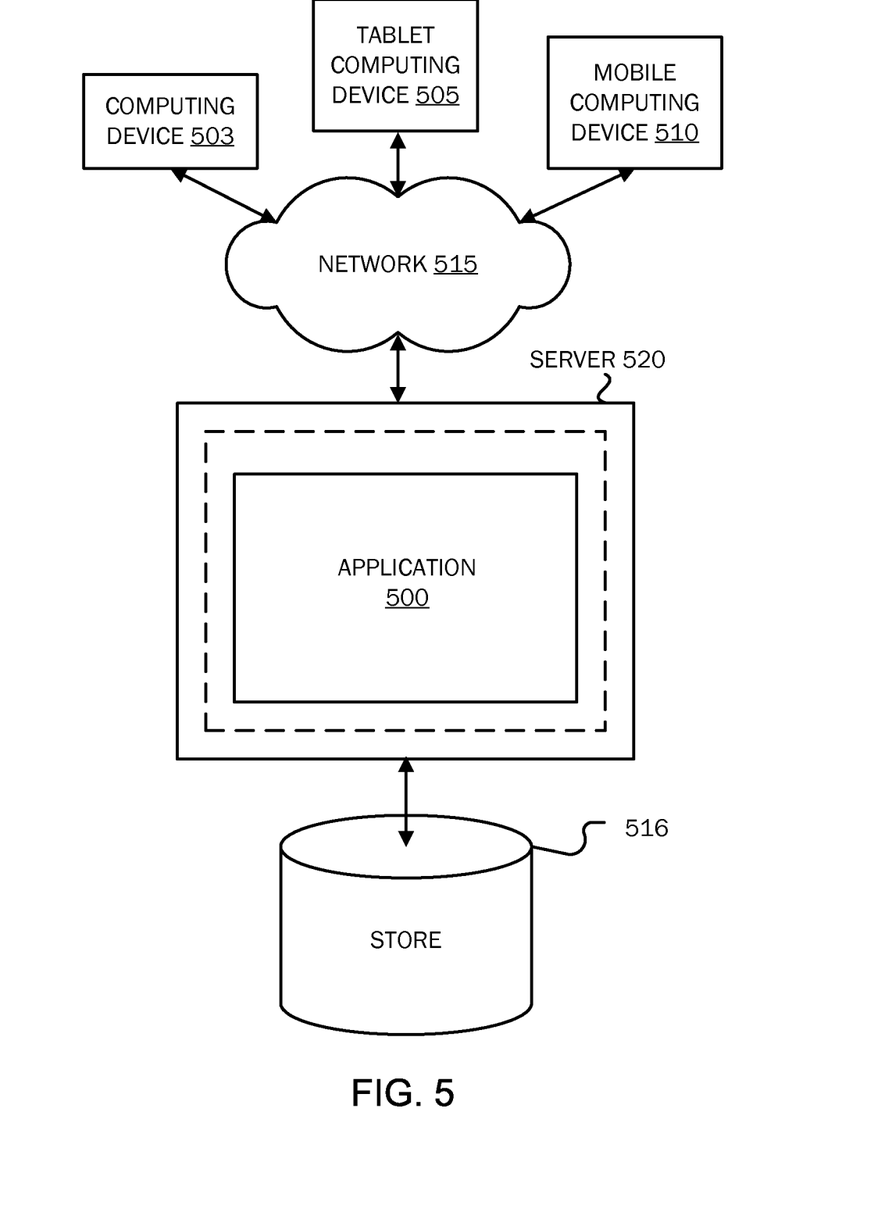
FIG. 5 is a simplified block diagram of a distributed computing system in which various embodiments may be practiced.

FIG. 5 is a simplified block diagram of a distributed computing system in which various embodiments may be practiced. The distributed computing system may include number of client devices such as a computing device 503, a tablet computing device 505 and a mobile computing device 510. The client devices 503, 505 and 510 may be in communication with a distributed computing network 515 (e.g., the Internet). A server 520 is in communication with the client devices 503, 505 and 510 over the network 515. The server 520 may store application 500 which may be perform routines including, for example, pairing and configuring a computing device for use in a meeting space, as described above with respect to the operations in routine 200 of FIG. 2.

Various embodiments are described above with reference to block diagrams and/or operational illustrations of methods, systems, and computer program products. The functions/acts noted in the blocks may occur out of the order as shown in any flow diagram. For example, two blocks shown in succession may in fact be executed substantially concurrently or the blocks may sometimes be executed in the reverse order, depending upon the functionality/acts involved.

While certain embodiments have been described, other embodiments may exist. Furthermore, although various embodiments have been described as being associated with data stored in memory and other storage mediums, data can also be stored on or read from other types of computer-readable media, such as secondary storage devices (i.e., hard disks, floppy disks, or a CD-ROM), a carrier wave from the Internet, or other forms of RAM or ROM. Further, the disclosed routine's operations may be modified in any manner, including by reordering operations and/or inserting or operations, without departing from the embodiments described herein.

It will be apparent to those skilled in the art that various modifications or variations may be made without departing from the scope or spirit of the embodiments described herein. Other embodiments will be apparent to those skilled in the art from consideration of the specification and practice of the embodiments described herein.

What is claimed is:

1. A method of pairing and configuring a computing device for use in a physical meeting space, comprising:
   receiving, by the computing device, a broadcast from an appliance communicating that the physical meeting space is available for a meeting, wherein the broadcast indicates that the appliance is available to establish a connection to facilitate the meeting, and further wherein the broadcast is restricted to a proximate physical location of the physical meeting space;
   automatically establishing, by the computing device, the connection with the appliance based on the broadcast from the appliance, comprising:
      identifying pairing instructions using at least one of a Third Party Control Protocol (TPCP) and a Session Initiated Protocol (SIP); and
      receiving an authentication code from the appliance; and
   joining the meeting in the physical meeting space via the computing device by connecting to the appliance.

2. The method of claim 1, wherein receiving, by a computing device, the broadcast from an appliance communicating the availability of the physical meeting space comprises receiving the broadcast from within the physical meeting space.

3. The method of claim 1, wherein establishing, by the computing device, the connection with the appliance, comprises generating a prompt on the computing device requesting confirmation of a scheduled meeting time in the physical meeting space.

4. The method of claim 1, wherein joining the meeting in the physical meeting space via the computing device comprises joining the meeting when the computing device is remotely located with respect to the appliance, the appliance being located in the physical meeting space.

5. The method of claim 4, further comprising:
   automatically updating a roster of meeting participants on the computing device; and
   communicating, via the computing device, one or more of content, commands and responses during the meeting.

6. The method of claim 1, wherein joining the meeting in the physical meeting space via the computing device comprises joining the meeting when the computing device is in proximity to the appliance, the appliance being located in the physical meeting space.

7. The method of claim 1, further comprising:
   starting the meeting when the computing device establishes the connection.

8. An apparatus comprising:
   a memory for storing executable program code; and
   a processor, functionally coupled to the memory, the processor being responsive to computer-executable instructions contained in the program code and operative to:
      receive a broadcast from a meeting appliance communicating that a physical meeting space is available for a meeting, wherein the broadcast indicates that the meeting appliance is available to establish a connection to facilitate the meeting, and further wherein the broadcast is restricted to a proximate physical location of the meeting space;
      automatically establish a connection with the meeting appliance based on the broadcast from the appliance, comprising:
         identifying pairing instructions using at least one of a Third Party Control Protocol (TPCP) and a Session Initiated Protocol (SIP); and receiving an authentication code from the appliance; and start the meeting in the physical meeting space by connecting to the meeting appliance.

9. The apparatus of claim 8, wherein the broadcast is restricted to the physical meeting space.

10. The apparatus of claim 8, wherein the connection is established in response to a prompt requesting confirmation of a scheduled meeting time in the physical meeting space.

11. The apparatus of claim 8, wherein the processor, in joining the meeting in the physical meeting space, is operative to automatically update a roster of meeting participants.

12. The apparatus of claim 8, wherein starting the meeting in the physical meeting space comprises starting the meeting when the apparatus is remotely located with respect to the appliance, the appliance being located in the physical meeting space.

13. A computer-readable storage device storing computer executable instructions which, when executed on a mobile computing device, cause the mobile computing device to perform a method of pairing and configuring the mobile computing device for use in a physical meeting space, the method comprising:

receiving, a broadcast from a meeting appliance communicating that a physical meeting space is available for a meeting, wherein the broadcast indicates that the meeting appliance is available to establish a connection to facilitate the meeting, wherein the meeting appliance is located in the physical meeting space, and wherein a broadcast is restricted to the proximate physical location of the meeting space;

utilizing paring instructions using at least one of a Third Party Control Protocol (TPCP) and a Session Initiated Protocol (SIP) and receiving an authentication code from the appliance to establish a connection with the meeting appliance based on the broadcast from the appliance; and starting a meeting in the physical meeting space by connecting to the meeting appliance.

14. The computer-readable storage device of claim 13, wherein utilizing pairing instructions to establish the connection with the meeting appliance comprises automatically connecting the mobile computing device to the meeting appliance.

15. The computer-readable storage device of claim 13, wherein utilizing pairing instructions to establish the connection with the meeting appliance comprises generating a prompt on the mobile computing device requesting confirmation from a user of a scheduled meeting time in the physical meeting space.

16. The computer-readable storage device of claim 13, wherein joining the meeting in the physical meeting space comprises joining the meeting when the mobile computing device is remotely located with respect to the meeting appliance.

17. The computer-readable storage device of claim 13, wherein joining the meeting in the physical meeting space comprises joining the meeting when the mobile computing device is in proximity to the meeting appliance.

18. The computer-readable storage device of claim 17, further comprising:

automatically updating a roster of meeting participants on the mobile computing device, wherein automatically updating the roster comprises:

updating a list of meeting participants who are physically present in the physical meeting space during the meeting;

updating a list of meeting participants who are remotely connected to the physical meeting space, via the meeting appliance, during the meeting; and automatically updating presence information associated with one or more of the meeting participants during the meeting.

19. The computer-readable storage device of claim 13, wherein the connection is established when the computing device is in the physical meeting space.

20. The computer-readable storage device of claim 13, wherein joining the meeting in the physical meeting space comprises starting the meeting when the mobile computing device establishes the connection.

* * * * *